US007964259B2

(12) United States Patent
Koshu et al.

(10) Patent No.: US 7,964,259 B2

(45) Date of Patent: Jun. 21, 2011

(54) SECURITY LABEL AND SECURITY LABEL SUPPLY SHEET

(75) Inventors: Wataru Koshu, Taito-ku (JP); Yoichi Takahashi, Shinjuku-ku (JP); Michiro Usui, Shinjuku-ku (JP); Kazuhiro Sasaki, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 1099 days.

(21) Appl. No.: 10/545,237

(22) PCT Filed: Jan. 26, 2005

(86) PCT No.: PCT/JP2005/000971

§ 371 (c)(1), (2), (4) Date: Aug. 12, 2005

(87) PCT Pub. No.: WO2005/078685

PCT Pub. Date: Aug. 25, 2005

(65) Prior Publication Data

US 2006/0077287 A1 Apr. 13, 2006

(30) Foreign Application Priority Data

Feb. 12, 2004 (JP) ................................ 2004-034732

(51) Int. Cl.

| | |
|---|---|
| ***B32B 9/00*** | (2006.01) |
| ***B32B 33/00*** | (2006.01) |
| ***B32B 7/12*** | (2006.01) |
| ***B32B 15/04*** | (2006.01) |

(52) U.S. Cl. ..................... 428/40.1; 428/41.8; 428/42.1; 428/195.1; 428/343; 428/352

(58) Field of Classification Search ................. 428/42.3, 428/40.1, 41, 42.1, 195.1, 201, 202, 343, 428/352

See application file for complete search history.

(56) References Cited

U.S. PATENT DOCUMENTS

| | | | | |
|---|---|---|---|---|
| 2,703,083 | A * | 3/1955 | Gross | 602/42 |
| 4,032,679 | A * | 6/1977 | Aoyagi | 428/42.3 |
| 4,584,219 | A * | 4/1986 | Baartmans | 428/42.3 |
| 5,770,283 | A | 6/1998 | Gosselin et al. | |
| 6,282,374 | B1 * | 8/2001 | Boyd et al. | 396/6 |
| 2002/0013161 | A1 * | 1/2002 | Schaeffer et al. | 455/557 |
| 2003/0122957 | A1 * | 7/2003 | Emme | 348/370 |
| 2003/0125008 | A1 * | 7/2003 | Shimamura | 455/344 |

FOREIGN PATENT DOCUMENTS

JP U 1-105962 7/1989

(Continued)

*Primary Examiner* — Patricia L Nordmeyer

(74) *Attorney, Agent, or Firm* — Oliff & Berridge, PLC

(57) ABSTRACT

A security label 1 according to the present invention can be removably applied on an image photographing device such as a mobile phone 2 incorporating therein a digital camera to cover a lens part 3 thereof. Upon removal, the security label 1 is bent and makes a trace emerge which shows that the security label 1 has been removed. By applying the security label 1 to the mobile phone 2 to cover the lens part 3 thereof, improper photography can be prevented. In a case where the security label 1 is removed to take a photograph, the trace remains on the security label 1 even if the security label 1 is applied again on the mobile phone 2 to cover the lens part 3 thereof. Thus, the fact that a photograph is improperly taken can be easily understood.

6 Claims, 7 Drawing Sheets

FOREIGN PATENT DOCUMENTS

| | | | |
|---|---|---|---|
| JP | A 10-116031 | | 5/1998 |
| JP | A 2000-35761 | | 2/2000 |
| JP | U 3068860 | | 3/2000 |
| JP | 2002271665 A | * | 9/2002 |
| JP | A 2002-318405 | | 10/2002 |
| JP | 2003345255 A | * | 12/2003 |
| JP | A 2003-345225 | | 12/2003 |
| JP | A 2005-99354 | | 4/2005 |

* cited by examiner

SECURITY LABEL AND SECURITY LABEL SUPPLY SHEET

BACKGROUND OF THE INVENTION

1. Field of the Invention

The present invention relates to the field of security. More particularly, it pertains to a security label to be used for an image photographing device such as a mobile phone incorporating therein a digital camera, a digital camera, and so on. The security label makes it temporarily impossible for the image photographing device to take a photograph, so as to prevent photographing of a confidential image or a copyrighted image.

2. Background Art

Various kinds of security labels have conventionally been developed and proposed. To give a conventional example, the package of a game machine such as a pinball machine may be improperly opened to alter a control part thereof, during shipment of the machine from a factory to a shop. In order to prevent such an improper opening of the package during distribution, a countermeasure such as that disclosed in Japanese Patent Laid-Open Publication No. 192321/1997 can be taken. That is, a control circuit substrate of a game machine which is vulnerable to an improper alteration is covered with a lid, and a sealing label is applied over the lid.

In order to prevent a manipulation of contents of a container such as a package, a manipulation prevention label has been employed which can certify that the package has not been opened. In the case of one type of commonly used manipulation prevention label, when the label is removed from a surface on which the label is applied, such as a container surface, a part of a print layer and an adhesive layer remain on the surface, and traces showing that the label has been removed from the surface remain on both the label and the surface. A manipulation prevention label of another type is proposed in Japanese Patent Laid-Open Publication No. 2003-345255. If the label of this type is removed from a surface on which the label is applied, no adhesive layer remains on the surface while the removed label has a trace showing that the label has been removed from the surface. Even if the removed label is again applied to the surface, the trace does not disappear.

Some sort of mobile phones incorporating therein a digital camera are configured to ensure that sounds such as “click!”, “cheese!”, and so on are emitted when a shutter clicks, so as to prevent a person from photographing in secret.

Recent powerful apparatuses such as mobile phones and PDAs incorporating therein a digital camera enable anyone to take photographs improperly. Namely, one can take a photograph of confidential images and documents, and send the same at once to a desired address. Such improper acts can be performed in a number of places, e.g., research facilities, government office buildings, corporations, galleries, museums, schools, examination halls, exhibition halls, theaters, sports stadiums, shops, bookshops, department stores, and so on. As described above, some mobile phones incorporating therein a digital camera are configured to emit sounds when a shutter clicks. However, such sounds are meaningless in a crowded and noisy place as well as in a deserted place where one can openly take a photograph. In addition, such electronic sounds have no use when a sound-emitting device such as a speaker is destroyed, or software is altered to mute the sounds.

Naturally, a digital camera is not configured to emit sounds in general, and thus has no measures for preventing improper photographing. Although prohibition of photography is sometimes announced in certain places, such an announcement is not necessarily observed. Temporary custody of a mobile phone and a digital camera is also conducted at some places. However, taking custody of and returning a mobile phone and a digital camera requires the issuance of a claim check and careful handling of the apparatuses. In the case where a mobile phone is under custody, there are the disadvantages that an owner cannot communicate through the phone in an emergency, and there is also the fear that personal data stored in the mobile phone are improperly accessed by another person.

The present invention is made in view of the above. An object of the present invention is to provide a security label and a security label supply sheet. Since the security label can be easily applied to and removed from an image photographing device such as a mobile phone incorporating therein a digital camera, or a digital camera, the security label can be used on the image photographing devices which are taken into places where photography is prohibited, so as to prevent improper photography.

By studying the prevention of improper photography using a mobile phone incorporating therein a digital camera, or a digital camera, the inventors developed a security label that will have a trace showing that the label has been removed, the trace being generated by a bending of the security label upon removal thereof. By applying such a security label to a lens part of the image photographing device, improper photography can be prevented. Even if one removes the security label from the device to take a photograph, and applies the security label again to the device to cover the lens part thereof, a trace showing that the label has been removed remains on the label. Therefore, it is possible to hold the photographer accountable for his or/her behavior.

SUMMARY OF THE INVENTION

A security label removably applied to an instrument according to the present invention comprises: a label body; and an adhesive layer disposed on a rear surface of the label body; wherein the label body includes a transparent film on a front surface of the label body, a patterned release layer disposed on a rear surface of the transparent film, and a print layer disposed on a rear surface of the release layer, and when the security label is released from the instrument, the security label is bent to bring the release layer away from the transparent film so that the release layer can be visually observed from the front surface.

In the security label, when the security label is restored to its original plate-like shape, the release layer of the label body may remain away from the transparent film.

In the security label, the label body may include a cushion layer disposed on a rear surface of the print layer, and the cushion layer may have a contraction stress which shrinks under a solidified condition, so that the release layer and an area of the print layer corresponding to the release layer may be drawn into the cushion layer, when the release layer is brought away from the transparent film.

In the security label, when the release layer is brought away from the transparent film, the release layer and the area of the print layer corresponding to the release layer may be drawn into the cushion layer, so that the area of the print layer corresponding to the release layer may be separated from another area of the print layer.

In the security label, an interface of the transparent film and the release layer, and an interface of the transparent film and the print layer may be formed of irregularity surfaces.

In the security label, the instrument may be an image photographing device including a lens part, and the security label may be applied to cover the lens part to prevent photographing.

In the security label, the adhesive layer may have a non-adhesive area for covering the lens part.

In the security label, the non-adhesive area may be formed of a protective member disposed on the adhesive layer.

In the security label, when the security label is released from the instrument, the whole adhesive layer may adhere to the label body, without remaining on the instrument.

A security label supply sheet according to the present invention comprises: a release paper; and a plurality of label bodies disposed on the release paper through an adhesive layer; wherein each of the label bodies includes a transparent film on a front surface of the label body, a patterned release layer disposed on a rear surface of the transparent film, and a print layer disposed on a rear surface of the release layer, and when the label body is released from an instrument, the label body is bent to bring the release layer away from the transparent film so that the release layer can be visually observed from the front surface.

In the security label supply sheet, the release paper may have a protective member area formed by cutting at a position corresponding to substantially a center part of the label body, and when the label body is released from the release paper, the protective member area may adhere to the label body.

The security label for preventing photography according to the present invention can prevent improper photography, by applying the security label on an image photographing device such as a mobile phone incorporating therein a digital camera, or a digital camera so as to cover a lens part of the device. When the security label is removed to take a photograph, a trace showing that the label has been removed remains on the label, even if the removed label is again applied to a surface of the device. Thus, it is possible to hold the photographer accountable for his or her behavior, so that an improper act of photography can be effectively prevented.

Upon removal, the security label together with the adhesive layer is completely removed from the image photographing device. Since no adhesive remains on the image photographing device, the device can be kept clean.

In addition, since the security label has a non-adhesive area which makes contact with the lens part of the image photographing device, the lens part can be prevented from being damaged.

When removed, the label body is bent to bring the release layer away from the transparent film. Then, the area of the print layer corresponding to the release layer is separated from another area of the print layer, so that a pattern of the release layer can be visually observed. Since the trace showing that the security label has been removed unfailingly remains on the label body, the fact that the security label has been removed can be easily and clearly recognized.

Since an interface of the transparent film and the release layer, and an interface of the transparent film and the print layer are formed of irregular surfaces, a pattern of the release layer becomes more easily visible to clearly show the trace, when the release layer is brought away from the transparent film to separate the area of the print layer corresponding to the release layer from another area of the print layer.

A security label supply sheet includes a board. When the label body is removed from the board, the label body has the adhesive layer on its rear surface, with a part of the adhesive layer being adhered to a protective member area of the board. The protective member area serves as a protective member for covering a lens part of an image photographing device. In this way, a security label for preventing photography can be provided, simply by removing the label body from the board.

DETAILED DESCRIPTION OF THE INVENTION

Figures 1A, 1B, 1C:
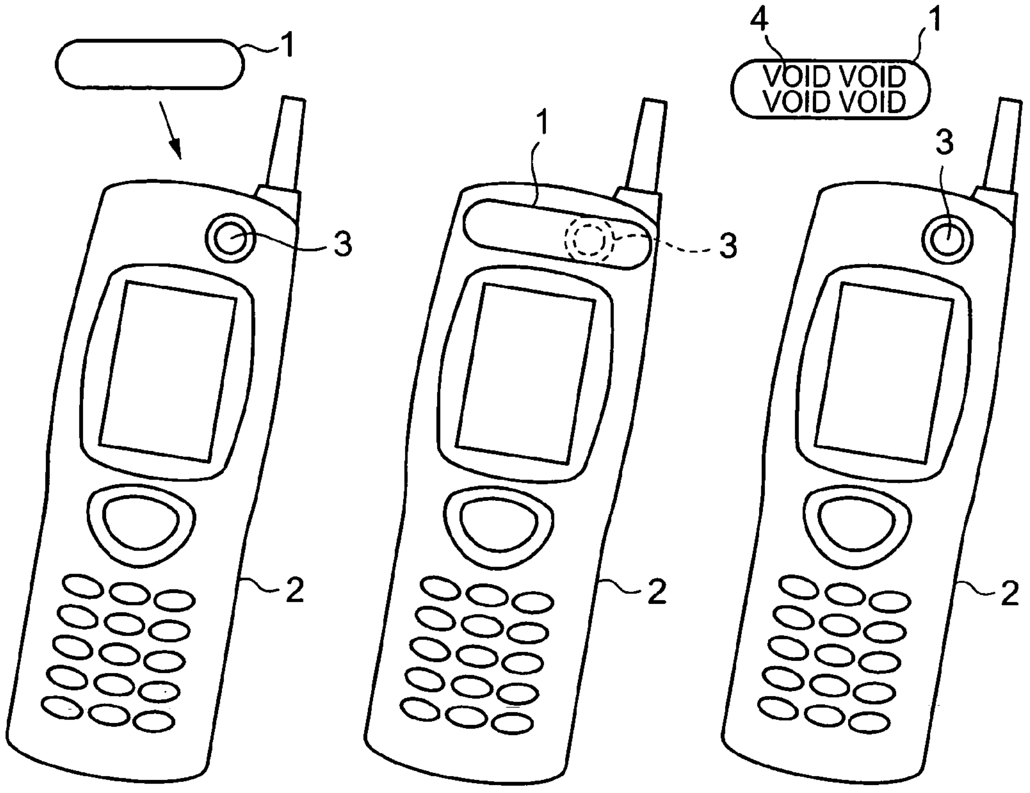
FIGS. 1A to 1C are views illustrating a use of a security label in an embodiment according to the present invention for a mobile phone incorporating therein a digital camera.

A preferred embodiment of the present invention will be described below with reference to the drawings. FIGS. 1A and 1B illustrate a use of a security label for preventing photography in an embodiment according to the present invention for an image photographing device such as a mobile phone incorporating therein a digital camera. In FIG. 1A, a security label 1 can be applied to a mobile phone 2 incorporating therein a digital camera (hereinafter referred to as an "object") to cover a lens part 3 thereof. Then, the security label 1 can be removed from the object 2. As shown in FIG. 1B, by applying the security label 1 on the object 2 to cover the lens part 3 thereof, photographing of an image can be prevented. As shown in FIG. 1C, when the security label 1 is removed from the object 2, a pattern 4 such as characters or pictures, which shows that the security label 1 has been removed, appears on the security label 1. Even if the security label 1 is applied again to the object 2, the pattern 4 such as characters or pictures on the security label 1 remains to be visually observed. That is, it is possible to leave, on the security label 1, a trace showing that the security label 1 has been removed.

In this manner, by applying the security label 1 on the object 2 to cover the lens part 3 thereof, improper photography can be prevented. When the security label 1 has thereon a trace showing that the security label 1 has been removed, an appropriate act can be taken to the suspicious photography. On the other hand, the security label 1 having no such a trace can show that no photograph has been taken.

Not limited to a mobile phone incorporating therein a digital camera, the security label 1 may be used for other image photographing devices such as a digital camera or another kind of camera. A form and dimensions of the security label 1 may be modified to fit an intended use thereof. For example, the security label 1 may be formed to be strip-shaped, rectangular, circular, and so on. A structure and a material of the security label 1 will be described below in detail.

Figure 2A:
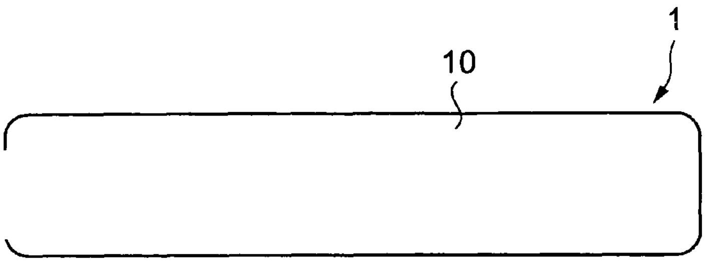
FIG. 2A is a schematic view of a front surface of the security label in the embodiment according to the present invention.
Figure 2B:
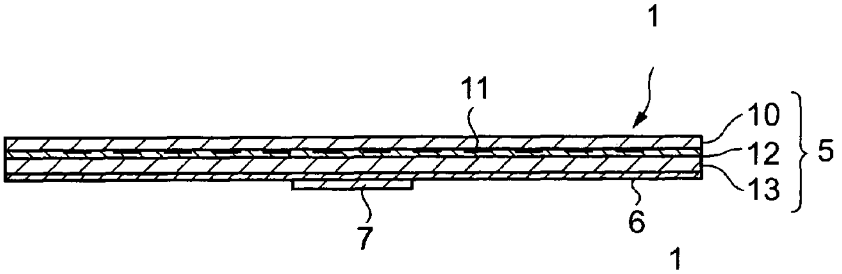
FIG. 2B is a schematic cross-sectional view of the security label.
Figure 2C:
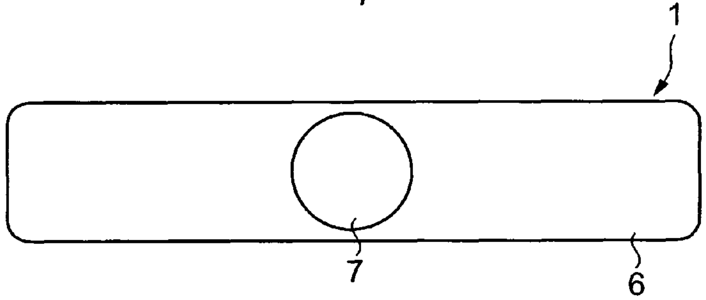
FIG. 2C is a schematic view of a rear surface of the security label.

FIG. 2A is a schematic view of a front surface of the security label 1, FIG. 2B is a schematic cross-sectional view of the security label 1, and FIG. 2C is a schematic view of a rear surface of the security label 1. The security label 1 includes a label body 5 whose form and dimensions fit an object to which the security label 1 is applied, an adhesive layer 6 disposed on a whole area of a rear surface of the label body 5, and a protective member 7 attached to substantially a center part of the adhesive layer 6 to form a non-adhesive area. The protective member 7 provides a non-adhesive surface which covers to protect the lens part 3 (see, FIG. 1), and is positioned such that, when the security label 1 is applied to an object, the protective member 7 covers the lens part 3 of the object.

The security label 1 is attached to a board formed of a released paper or a mold releasing film. In use, the security label 1 is removed from the board, and is applied to an object. Preferably, the protective member 7 is formed by a part of the board, which will be described hereinafter.

Figure 4:
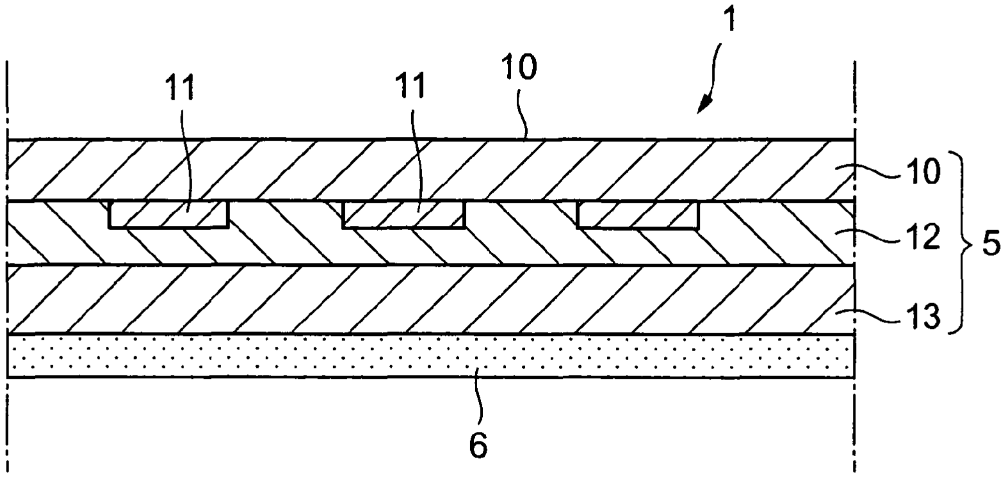
FIG. 4 is a partially enlarged schematic cross-sectional view of the security label shown in FIGS. 2A to 2C.

FIG. 4 is an enlarged schematic cross-sectional view of the label body 5 and the adhesive layer 6 of the security label 1. In FIGS. 2B and 4, the label body 5 has a transparent film 10, a patterned release layer 11 having a releasability which is disposed on a rear surface of the transparent film 10, and a print layer 12 which is formed to cover the rear surface of the transparent film 10 and the release layer 11, and a cushion layer 13 having cushion and film properties which is formed to cover the print layer 12. The adhesive layer 6 is formed on a rear surface of the cushion layer 13. A surface of the transparent film 10 may be subjected to a special mat process.

The transparent film 10 may be formed of a transparent polymer film such as polyethylene terephthalate (PET), polyvinyl chloride (PVC), polypropylene (PP), polystyrene (PS), or polycarbonate (PC). In this embodiment, the transparent film 10 is a both-side inline formed film subjected to an easy adhesive coating. An original print may be imparted to a surface of the transparent film 10.

The release layer 11 has a releasability from the transparent film 10. That is, when the label body 5 is removed from the object 2, the label body 5 is bent to bring the release layer 11 away from the transparent film 10. Specifically, the release layer 11 is preferably formed of UV (ultraviolet cure) silicon resin. However, not limited thereto, a material of the release layer 11 may be silicon type, fluoroplastic type, mat particle type, fat type represented by acrylic ester of higher alcohol such as stearyl acrylate, cellulose ester represented by cellulose nitrate, or ether type. A pattern imparted to the release layer 11 may be characters such as "VOID" or "OPENED". Alternatively, the pattern may be a suitable picture or a tint block. Such a pattern may be formed by relief printing, flexographic printing, or screen printing. By this printing, the pattern such as characters or a picture emerges when the label body 5 is removed.

The print layer 12 has a print which emerges when the security label 1 attached on the object 2 is removed therefrom. The print layer 12 displays the pattern of the release layer 11 which is brought away from the transparent film 10, when the security label 1 is removed from the object 2.

The cushion layer 13 has a contraction stress and has an irreversible elastically-deformable property. Thus, when the release layer 11 is brought away from the transparent film 10 to release a part of a surface of the cushion layer 13 attached to the transparent film 10 through the print layer 12, the part of the cushion layer 13 shrinks. The cushion layer 13 may be formed by coating or laminating a coating layer on the print layer 12. The coating layer can be formed by coating or laminating which is incorporated in the same line as the processing for the above layers, by using a UV resin, or by means of a hot melt or dry laminate. To be specific, the cushion layer 13 is formed of a material of urethane acrylate type, polyester acrylate type, or acryl monomer meltage of polymer. After being coated, these materials of urethane acrylate type, polyester acrylate type, and acryl monomer meltage of polymer can cure, with maintaining a contraction stress. Thus, these materials satisfy features required for the cushion layer 13.

The adhesive layer 6 has a function of removably adhering the label body 5 to the object 2. It is preferable that, when the label body 5 is removed from the object 2, the adhesive layer 6 along with the label body 5 can be completely removed from the object 2, without remaining thereon. Specifically, the adhesive layer 6 is formed by coating an adhesive having a rubber elasticity on a surface of the cushion layer 13. Kinds or adhesive properties of the adhesive layer 6 may be suitably selected in accordance with surface properties of the object 2.

Figure 3:
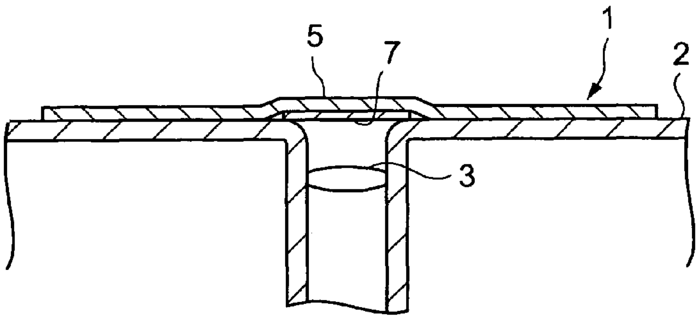
FIG. 3 is a schematic cross-sectional view of the security label shown in FIGS. 2A to 2C which is applied to an object.

As shown in FIG. 3, when used, the security label 1 is applied to a case of the object 2 such that the protective member 7 covers the lens part 3 of the object 2. By covering the lens part 3 of the object 2 with the protective member 7, it is prevented to take a photograph. Since the protective member 7 is correspondingly positioned on the lens part 3 to protect the same, the adhesive of the adhesive layer 6 does not stick on the lens part 3 so that the lens part 3 is protected from dusts and damages.

Figure 5:
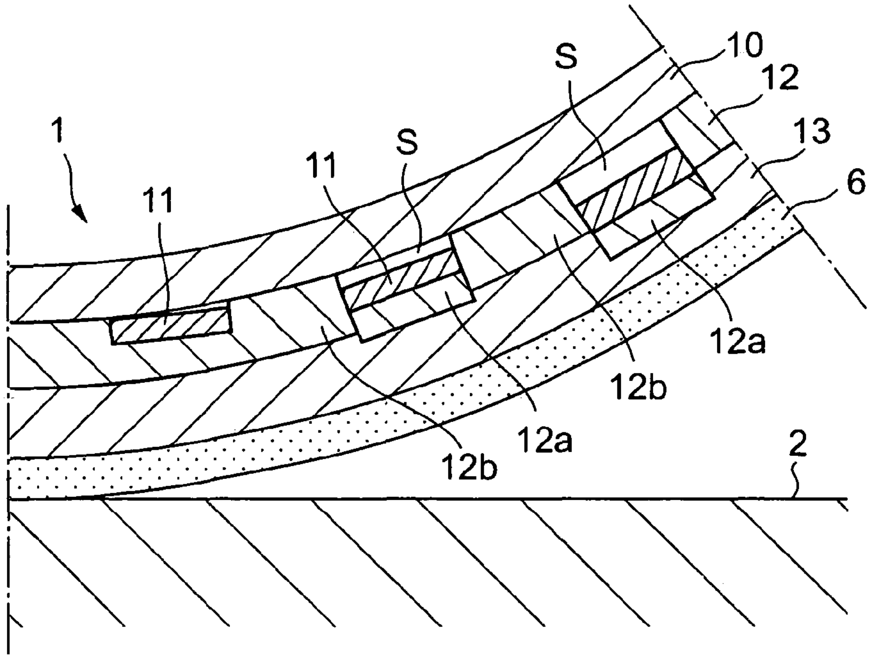
FIG. 5 is a schematic cross-sectional view of the security label shown in FIG. 4 which is in the course of being released.

As shown in FIG. 5, when the security label 1 applied on the object 2 is removed therefrom, the security label 1 is bent to bring the release layer 11 away from the transparent film 10, because the release layer 11 cannot follow the bent transparent film 10. Then, the contraction stress of the cushion layer 13 draws therein the release layer 11 and an area 12*a* of the print layer 12 corresponding to the release layer 11. Then, the area 12*a* of the print layer 12 is separated from an area 12*b* of the print layer 12 which is formed on a rear surface of the transparent film 10. The release layer 11 away from the transparent film 10 and the separated area 12*a* of the print layer 12 are held to be drawn in the cushion layer 13 because of its irreversible elastically-deformable property. Maintaining this state, the security label 1 is removed from the object 2.

Figure 6:
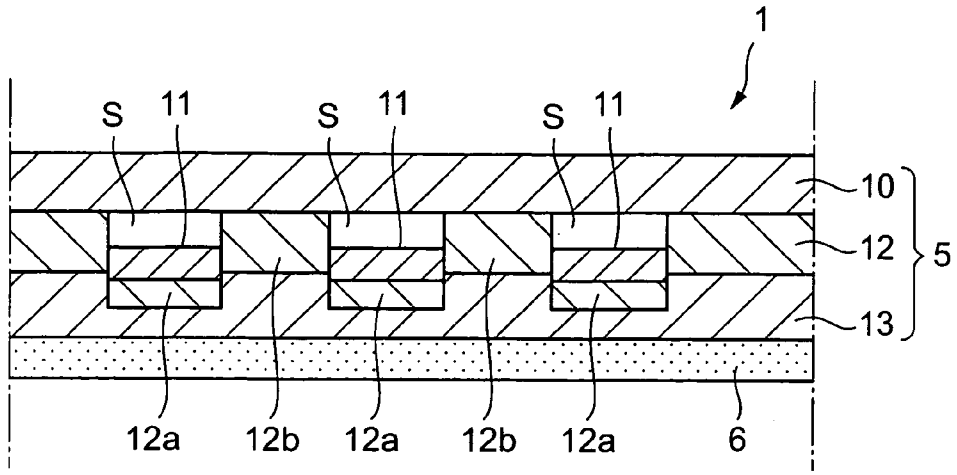
FIG. 6 is a partial schematic cross-sectional view of the removed security label.

As shown in FIG. 6, even when the removed security label 1 is restored to its original plate-like shape, the release layer 11 and the area 12*a* of the print layer 12 remain away from the transparent film 10 to be drawn in the cushion layer 13, because of its irreversible elastically-deformable property. A gap S is generated between the transparent film 10 and the release layer 11, and the area 12*a* of the print layer 12 and the area 12*b* thereof are remained to be staggered from each other with respect to the transparent film 10. Since the gap S partially transmits a light, a color of the area 12*a* of the print layer 12 seems to be changed. On the other hand, since the area 12*b* of the print layer 12 on which no release layer 11 is disposed remains tightly in contact with the transparent film 10, an original color of the print area 12*b* is maintained.

Therefore, the pattern such as "VOID" formed by the release layer 11 emerges as a trace showing that the security label 1 has been removed from the object 2. The emerged pattern such as "VOID" formed by the release layer 11 will not disappear, even when the removed security label 1 is applied again to the object 2. Thus, when the security label 1 is again applied on the object 2, it can be easily understood, only at a glance of the surface of the security label 1, whether the security label 1 has been removed from the object 2 or not.

As described above, by applying the security label 1 on the object 2 such as a mobile phone incorporating therein a digital camera, improper photography can be prevented. This is because it can be easily understood whether the security label 1 has been removed from the object 2 to take a photograph or not. After use, the security label 1 is removed from the object 2 and discarded. The security label 1 together with the adhesive layer 6 and the protective member 7 is completely removed from the object 2. Thus, none of the adhesive layer 6, the print layer 12, and the release layer 11 remains on the object 2, i.e., no residual remains on the lens part 3 and the case of the object 2. Since an appearance of the object 2 can be held clean, the security label 1 will not make a user of the object 2 feel uncomfortable.

In the above embodiment, an interface of the transparent film 10 and the release layer 11, and an interface of the transparent film 10 and the print layer 12 are formed of smooth surfaces. However, the interface of the transparent film 10 and the release layer 11, and the interface of the transparent film 10 and the print layer 12 may be formed of irregular surfaces such as satin finished surfaces, in place of the smooth surfaces.

As shown in FIG. 6, in the case where the interfaces are formed of irregular surfaces, when the gap S is generated between the transparent film 10 and the release layer 11, the irregular surfaces can further lower a transparency in the area 12*a* of the print layer 12 on which the release layer 11 is disposed, while the color of the area 12*b* of the print layer 12 on which no release layer 11 is disposed remains unchanged. Accordingly, the pattern such as "VOID" formed by the release layer 11 can be more clearly seen, which is advantageous.

Figure 7A:
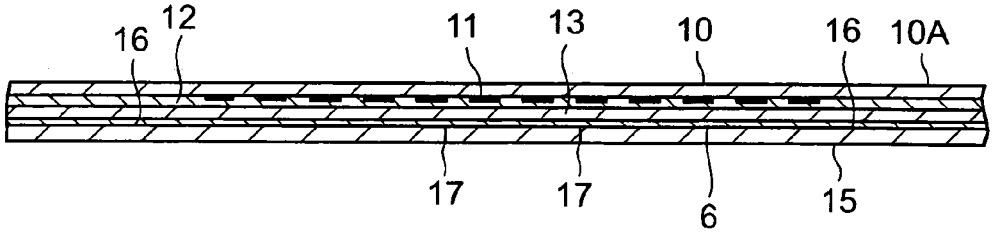
FIGS. 7A and 7B are schematic cross-sectional views of the security label which is in the course of being manufactured.

A method of manufacturing the security label 1 as constituted above will be described below. As shown in FIG. 7A, a film (e.g., a mat processed film) 10A of a larger area for forming the transparent film 10 is prepared. The film 10A is, for example, a continuous strip of film or a cut sheet. The release layer 11 formed of a component having a releasability is printed on a rear surface of the film 10A. Then, a printing process (print layer 12) with the desired number of colors is carried out to cover the release layer 11. Thereafter, a coating layer (cushion layer 13) is coated or laminated to cover the print layer 12. The coating layer can be formed, in the same line as the processing for the above layers, by using a UV resin, or by means of a hot melt or dry laminate. Then an adhesive (adhesive layer 6) is applied to cover the cushion layer 13.

Figure 8A:
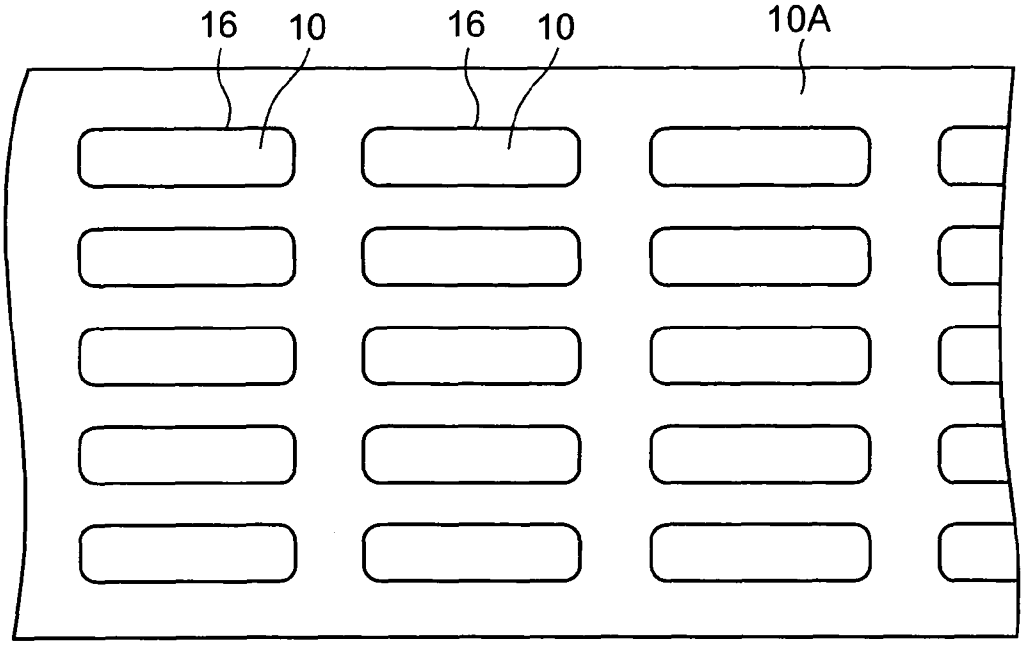
FIG. 8A is a schematic view showing the front surfaces of the security labels in the course of being manufactured.
Figure 8B:
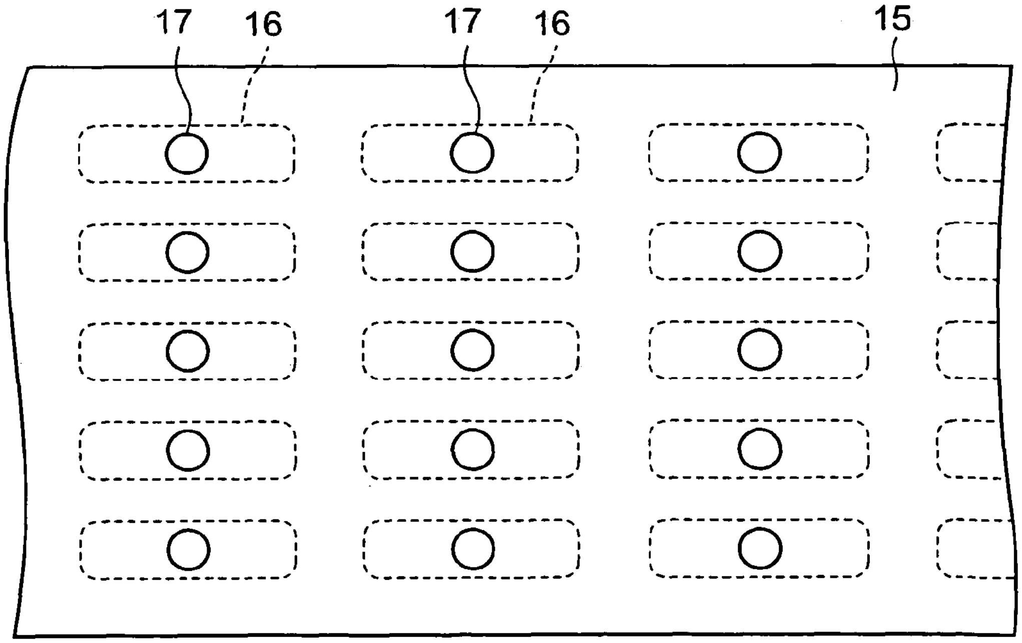
FIG. 8B is a schematic view showing the rear surfaces of the security labels in the course of being manufactured.

After a released paper 15 or a mold releasing film is laminated on the adhesive layer 6, a plurality of scores 16 are formed on a front surface of the film 10A, as shown in FIG. 8A, by cutting the film 10A from the front surface thereof, with the use of a cutting edge such that the cutting edge reaches the adhesive layer 6. The cutting edge is of a shape corresponding to the security label 1 to be manufactured (see FIG. 2A). As shown in FIG. 8B, a plurality of scores 17 are formed on a rear surface of the released paper 15 by cutting the released paper 15 from the rear surface thereof (from the released paper 15), with the use of a cutting edge such that the cutting edge reaches the adhesive layer 6. The cutting edge is of a shape corresponding to the protective member 7 (see FIG. 2C). Each of the scores 17 is formed to be positioned at substantially a center part of an area surrounded by each of the scores 16 formed on an upper surface. That is, the score 17 is formed so that the protective member 7 is attached on the rear surface of the security label 1, which is shown in FIGS. 2B and 2C.

Figure 7B:
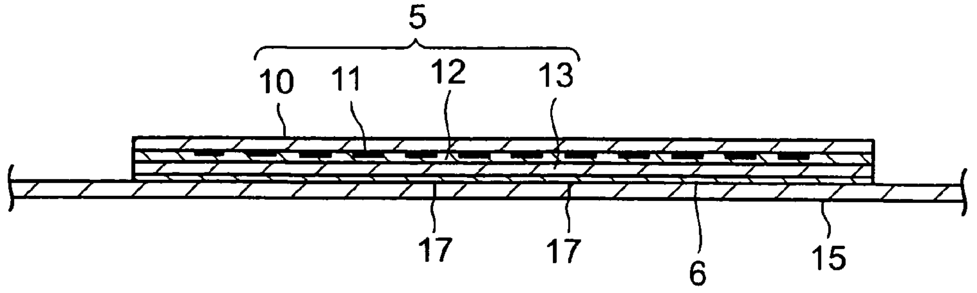
Figure 9A:
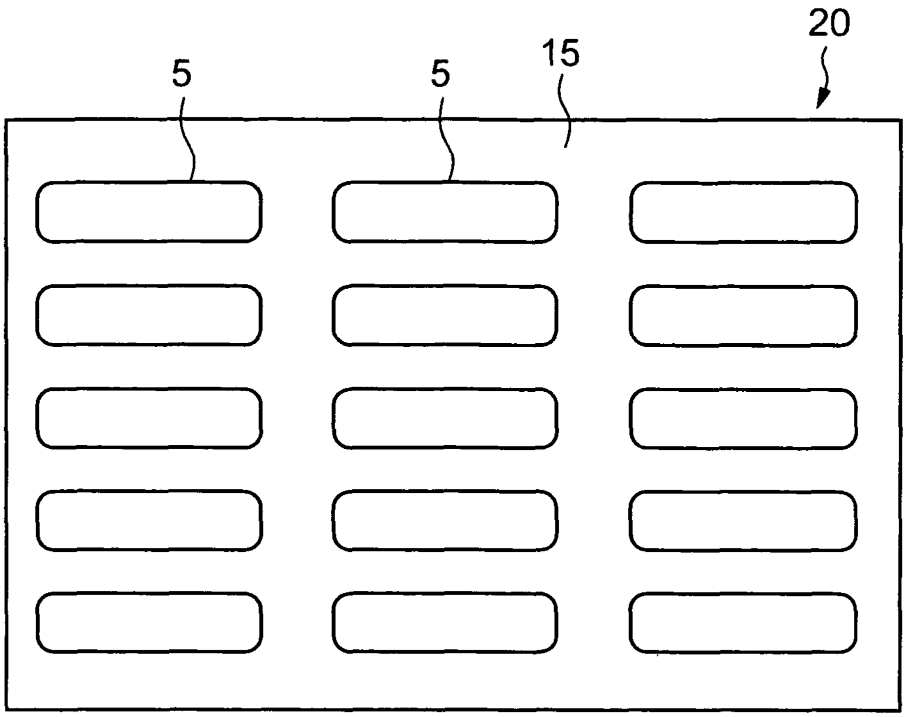
FIG. 9A is a schematic view of a front surface of a security label supply sheet in an embodiment according to the present invention.

Thereafter, unnecessary parts of the film 10A on the front surface, and unnecessary parts of the layers attaching to the film 10A such as the print layer 12, the cushion layer 13, and the adhesive layer 6 are eliminated from the released paper 15. As shown in FIG. 7B, a plurality of insular label bodies 5 are attached on the released paper 15 through the adhesive layers 6, each label body 5 having the transparent film 10, the release layer 11, the print layer 12, and the cushion layer 13, which are laminated thereon. Subsequently, the released paper 15 is cut into a desired delivery state, so that a security label supply sheet 20 shown in FIGS. 9A and 9B can be manufactured.

The security label supply sheet 20 manufactured as above includes a plurality of insular label bodies 5 removably attached on a board formed of the released paper 15 through the adhesive layers 6. Each of the label bodies 5 is of a size capable of being applied to the object 2 to cover the lens part 3 thereof. The label body 5 is constituted such that a trace which can be visually observed from the front surface emerges, when the label body 5 is bent upon removal thereof from the object 2.

Figure 9B:
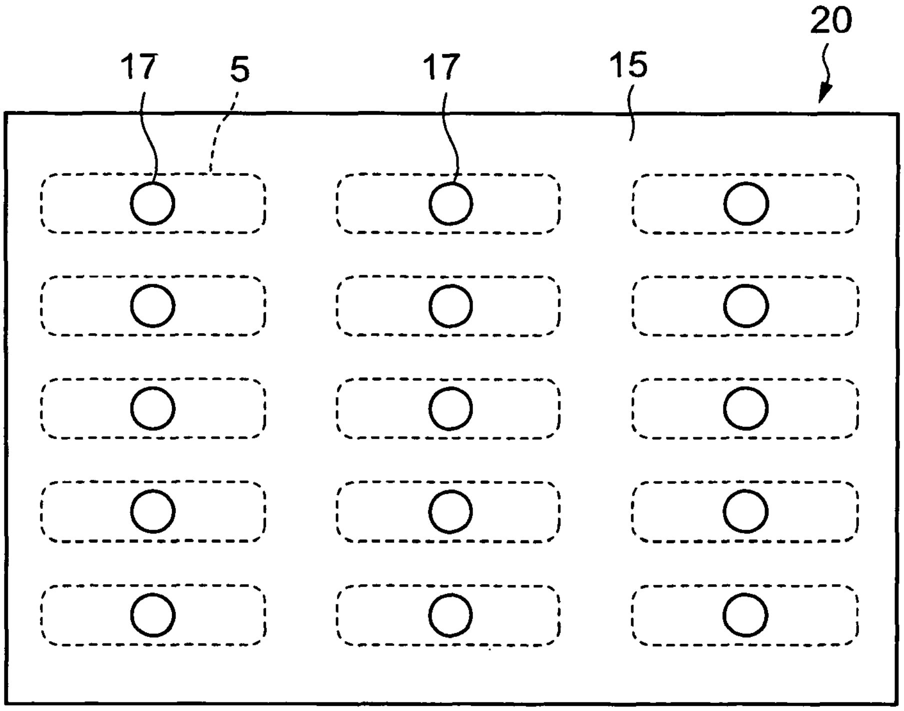
FIG. 9B is a schematic view of a rear surface of the security label supply sheet.
Figure 10A:
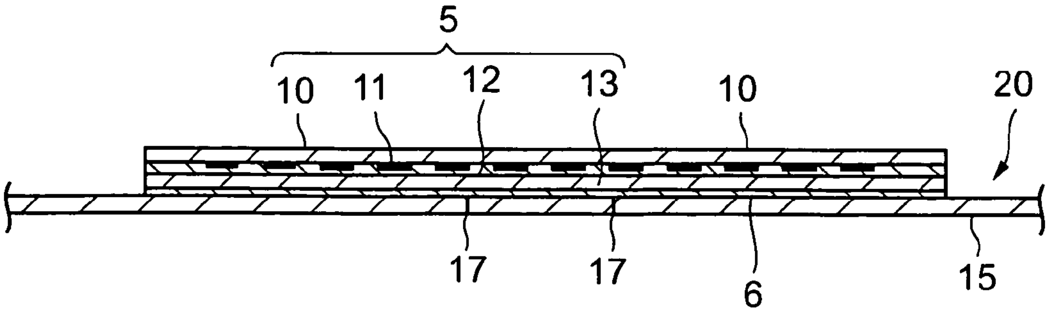
FIG. 10A is a partially enlarged cross-sectional view of the security label supply sheet shown in FIG. 9.

As shown in FIGS. 9B and 10A, the board (released paper) 15 has the scores 17 formed thereon, each surrounding an area which covers the lens part 3 when the label body 5 is applied to the object 2. Thus, when the label body 5 is removed from the board 15, the area (protective member area) 7 surrounded by each of the scores 17 formed on the board 15 adheres to the label body 5.

Figure 10B:
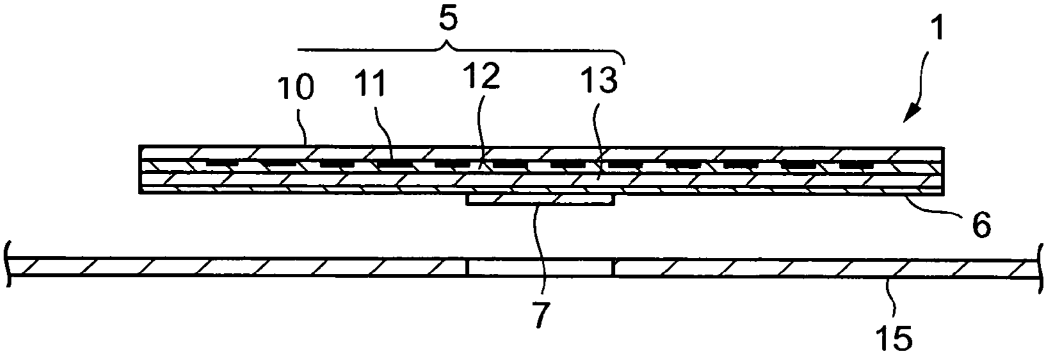
FIG. 10B is a schematic cross-sectional view of the security label supply sheet having a board from which a label body is removed.

In use, by removing one of the label bodies 5 from the security label supply sheet 20, as shown in FIG. 10B, the security label 1 is formed, which has the adhesive layer 6 on the rear surface of the label body 5, with a part of the board 15 adhering to the adhesive layer 6 at substantially a center part thereof to serve as the protective member 7. Then, the security label 1 is applied to the object 2 such as a mobile phone incorporating therein a digital camera.

There is a possibility that the label body 5 may be bent when the label body 5 is removed from the board 15. However, since the board 15 is formed of a released paper or a mold releasing film, an adhesive force thereof relative to the label body 5 is relatively weak. Therefore, it is unlikely that a trace emerges when the label body 5 is removed from the board 15. Namely, no problem is posed in practical use of the label body 5 after removing the label body 5 from the board 15.

In the above embodiment, the lens part 3 is protected from dusts and damages, by attaching a part of the board 15 as the protective member 7 to a position opposite to the lens part 3 of the security label 1. Alternatively, a label serving as the protective member 7 formed of paper, film, or nonwoven may be attached to the adhesive layer 6 for protecting a lens part. Thereafter, a released paper or a mold releasing film may be attached to the adhesive layer 6.

In place of the protective member 7, the lens part 3 can be protected by forming a part of the adhesive layer 6 to be a non-adhesive surface which corresponds to a part of the label body 5 to be in contact with the lens part 3.

In the above embodiment, the label body 5 having the constitution shown in FIGS. 4 to 6 is used for emerging a trace showing that the label body 5 has been removed. However, not limited to this constitution, other constitutions can be suitably used which can, when a label body is bent upon removal thereof, make hidden characters or patterns emerge, or make characters or patterns drop, so as to leave a trace showing that the label body has been removed.

The invention claimed is:

1. A combination of an image photographing device and a security label, the combination comprising:

an image photographing device including a lens part; and a security label configured to be removably applied to the photographing device, the security label comprising:

a label body; and an adhesive layer disposed on a rear surface of the label body, the adhesive layer comprising a non-adhesive area and an adhesive area, the non-adhesive area being formed of a protective member disposed on the adhesive layer and being configured to cover the lens part of the photographing device and the adhesive area being configured to removably adhere to a peripheral part of the photographing device surrounding the lens part when the non-adhesive area is applied to cover the lens part; wherein the label body includes a transparent film on a front surface of the label body, a patterned release layer disposed on a rear surface of the transparent film, and a print layer disposed on a rear surface of the release layer, and the security label is configured to be bent to bring the release layer away from the transparent film when the security label is released from the photographing device to cause the release layer to be visible from the front surface.

2. The combination according to claim 1, wherein when the security label is restored to its original shape, the release layer of the label body remains away from the transparent film.

3. The combination according to claim 1, wherein the label body includes a cushion layer disposed on a rear surface of the print layer, and the cushion layer has a contraction stress which shrinks under a solidified condition, so that the release layer and an area of the print layer corresponding to the release layer are drawn into the cushion layer, when the release layer is brought away from the transparent film.

4. The combination according to claim 3, wherein when the release layer is brought away from the transparent film, the release layer and the area of the print layer corresponding to the release layer are drawn into the cushion layer, so that the area of the print layer corresponding to the release layer is separated from another area of the print layer.

5. The combination according to claim 1, wherein an interface of the transparent film and the release layer, and an interface of the transparent film and the print layer are formed of irregularity surfaces.

6. The combination according to claim 1, wherein when the security label is released from the photographing device, the whole adhesive layer adheres to the label body, without remaining on the photographing device.

* * * * *